United States Patent
Kodaypak et al.

(10) Patent No.: US 10,375,528 B2
(45) Date of Patent: Aug. 6, 2019

(54) DYNAMICALLY SWITCHING BETWEEN BROADCAST AND UNICAST SERVICES FOR SERVICE CONTINUITY BETWEEN WIRELESS NETWORKS

(71) Applicant: AT&T INTELLECTUAL PROPERTY I, L.P., Atlanta, GA (US)

(72) Inventors: Rajendra Prasad Kodaypak, Sammamish, WA (US); Ryan Redfern, Cerritos, CA (US); Jiansong Wang, Parlin, NJ (US); Gaurav Gupta, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 160 days.

(21) Appl. No.: 14/795,361

(22) Filed: Jul. 9, 2015

(65) Prior Publication Data
US 2017/0013421 A1    Jan. 12, 2017

(51) Int. Cl.
*H04W 4/06* (2009.01)
*H04W 72/00* (2009.01)
*H04W 36/00* (2009.01)

(52) U.S. Cl.
CPC ......... *H04W 4/06* (2013.01); *H04W 36/0007* (2018.08); *H04W 72/005* (2013.01)

(58) Field of Classification Search
None
See application file for complete search history.

(56) References Cited

U.S. PATENT DOCUMENTS

| | | | |
|---|---|---|---|
| 8,345,610 B2 | 1/2013 | Zhang et al. | |
| 8,595,141 B2 | 11/2013 | Hao et al. | |

(Continued)

FOREIGN PATENT DOCUMENTS

| | | | |
|---|---|---|---|
| EP | 2051408 A1 | 4/2009 | |
| EP | 2234420 A1 | 9/2010 | |

(Continued)

OTHER PUBLICATIONS

Xu, et al. "On functionality separation for green mobile networks: concept study over LTE." Communications Magazine, IEEE 51.5 (2013): pp. 82-90.

(Continued)

*Primary Examiner* — Chirag G Shah
(74) *Attorney, Agent, or Firm* — Amin, Turocy & Watson, LLP

(57) ABSTRACT

Dynamically switching between broadcast and unicast services for service continuity between wireless networks is presented herein. A system can comprise a detection component configured to determine that a mobile device is receiving a broadcast transmission of broadcast data from a broadcast enabled access point device configured to send, via a broadcast service wireless coverage area, the broadcast data to multiple devices via a point-to-multipoint communication protocol. Further, the detection component can detect a movement of the mobile device from the broadcast service wireless coverage area to a unicast service wireless coverage area. A transfer component can initiate, in response to the detection, a unicast transmission of the broadcast data from a unicast enabled access point device to the mobile device—the unicast enabled access point device configured to send, via the unicast service wireless coverage area, the broadcast data to a single device via a point-to-point communication protocol.

18 Claims, 15 Drawing Sheets

(56) References Cited

U.S. PATENT DOCUMENTS

| | | | |
|---|---|---|---|
| 8,625,606 | B2 | 1/2014 | Drevo |
| 8,656,029 | B2 | 2/2014 | Chu et al. |
| 8,744,439 | B2 | 6/2014 | Deivasigamani et al. |
| 8,780,876 | B2 | 7/2014 | Etemad et al. |
| 8,819,264 | B2 | 8/2014 | Rodrigues |
| 9,338,715 | B1 * | 5/2016 | Sevindik ............... H04W 76/40 |
| 2008/0069071 | A1 * | 3/2008 | Tang ................... H04W 72/005 |
| | | | 370/342 |
| 2010/0128649 | A1 | 5/2010 | Gonsa et al. |
| 2011/0067081 | A1 * | 3/2011 | strom ................. H04L 12/1836 |
| | | | 725/110 |
| 2011/0305183 | A1 | 12/2011 | Hsu et al. |
| 2012/0236776 | A1 | 9/2012 | Zhang et al. |
| 2012/0239779 | A1 * | 9/2012 | Einarsson ......... H04L 29/06027 |
| | | | 709/217 |
| 2013/0028118 | A1 | 1/2013 | Cherian et al. |
| 2013/0039251 | A1 | 2/2013 | Wilkinson et al. |
| 2013/0064162 | A1 | 3/2013 | Phan et al. |
| 2013/0145402 | A1 | 6/2013 | Kotecha et al. |
| 2013/0294321 | A1 | 11/2013 | Wang et al. |
| 2013/0343259 | A1 | 12/2013 | Barrett |
| 2014/0095668 | A1 | 4/2014 | Oyman |
| 2014/0286224 | A1 | 9/2014 | Yu et al. |
| 2014/0314047 | A1 | 10/2014 | Kalhan et al. |
| 2015/0009821 | A1 | 1/2015 | Sridhar et al. |
| 2015/0040162 | A1 | 2/2015 | Kotecha et al. |
| 2015/0049661 | A1 | 2/2015 | Draznin et al. |
| 2015/0109987 | A1 * | 4/2015 | Wang .................... H04W 12/08 |
| | | | 370/312 |
| 2015/0249750 | A1 * | 9/2015 | Kakadia .............. H04M 15/805 |
| | | | 455/406 |
| 2016/0269189 | A1 * | 9/2016 | Xu .......................... H04W 4/06 |
| 2016/0308684 | A1 * | 10/2016 | Zhu .......................... H04W 4/06 |
| 2016/0323846 | A1 * | 11/2016 | Park ........................ H04W 4/08 |

FOREIGN PATENT DOCUMENTS

| | | |
|---|---|---|
| JP | 2005348392 A | 12/2005 |
| WO | 2014022546 A1 | 2/2014 |
| WO | 2014107605 A1 | 7/2014 |

OTHER PUBLICATIONS

Araniti, et al. "LTE for vehicular networking: a survey." Communications Magazine, IEEE 51.5 (2013): pp. 148-157.

Phunchongharn, et al. "Resource allocation for device-to-device communications underlaying LTE-advanced networks." Wireless Communications, IEEE 20.4 (2013): pp. 91-100.

Wetterwald, Michelle. "A case for using MBMS in geographical networking." Intelligent Transport Systems Telecommunications,(ITST), 2009 9th International Conference on. IEEE, 2009.

Kodaypak, et al. "Network Assisted Data Transfer Between Broadcast and Unicast for Service Continuity." Last Oct. 9, 2015. 2 Pages.

* cited by examiner

US 10,375,528 B2

DYNAMICALLY SWITCHING BETWEEN BROADCAST AND UNICAST SERVICES FOR SERVICE CONTINUITY BETWEEN WIRELESS NETWORKS

TECHNICAL FIELD

The subject disclosure generally relates to embodiments for dynamically switching between broadcast and unicast services for service continuity between wireless networks.

BACKGROUND

Conventional wireless technologies, such as long term evolution (LTE) evolved Multimedia Broadcast Multicast Service (eMBMS), enable users to access a broadcast steam of video content using handheld devices. However, such technologies have had some drawbacks with respect to streaming multimedia content to a mobile device while the mobile device moves between a broadcast enabled service area and a unicast enabled service area, leaving much room for improvement.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
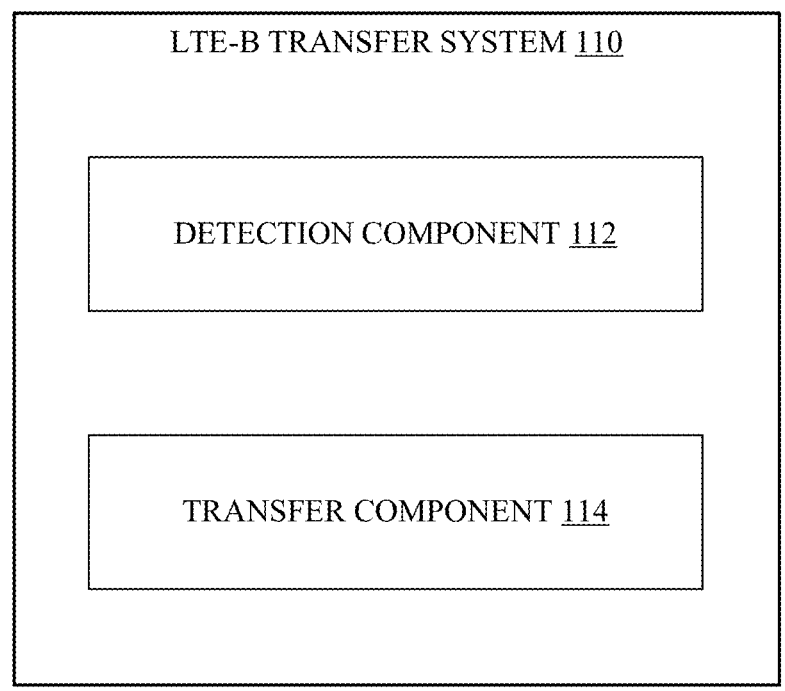
FIG. 1 illustrates a block diagram of an LTE broadcast transfer system, in accordance with various embodiments.
Figure 2:
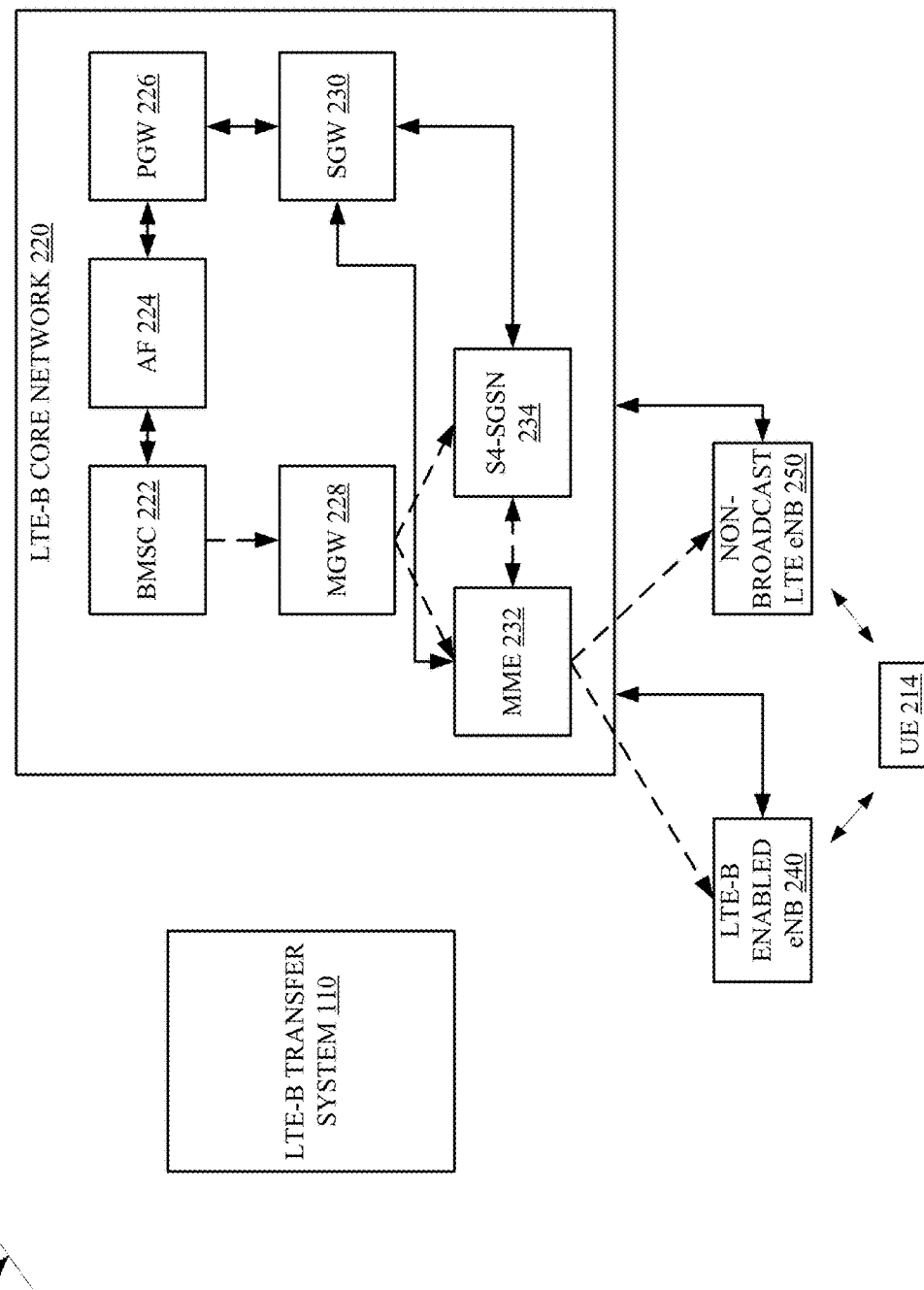
FIG. 2 illustrates a block diagram of an LTE broadcast environment including an LTE non-broadcast enabled wireless access point, in accordance with various embodiments.
Figure 3:
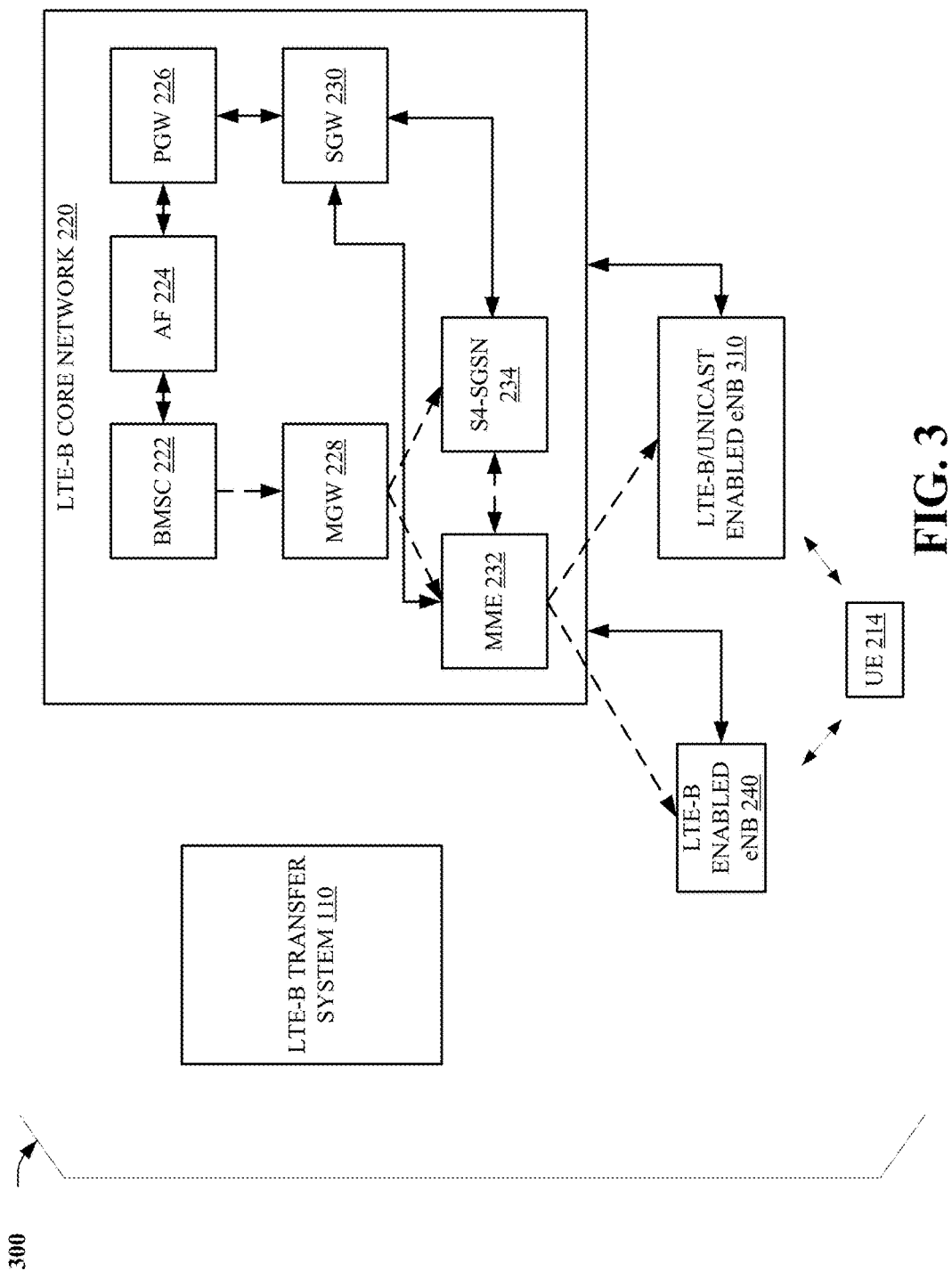
FIG. 3 illustrates a block diagram of a transfer component, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As mentioned, conventional mobile network technologies have had some drawbacks with respect to streaming multimedia content to a mobile device while the mobile device moves between a broadcast enabled service area and a unicast enabled service area. Various embodiments disclosed herein can provide continuous, or near continuous, streaming of multimedia content, e.g., premium video broadcast content, when a mobile device moves between a broadcast service wireless coverage area and a unicast service wireless coverage area.

For example, a system can comprise a processor, and a memory that stores executable instructions that, when executed by the processor, facilitate performance of operations, comprising: determining that a mobile device is receiving a broadcast transmission of broadcast data from a broadcast enabled access point device—the broadcast enabled access point device, e.g., corresponding to an LTE eMBMS video broadcast service, an enhanced MBMS (eMBMS) service, etc. configured to send, via a broadcast service wireless coverage area, the broadcast data to multiple devices via a point-to-multipoint communication protocol; detecting a first movement of the mobile device from the broadcast service wireless coverage area to a unicast service wireless coverage area; and in response to the detecting of the first movement, initiating a unicast transmission of the broadcast data from a unicast enabled access point device to the mobile device—the unicast enabled access point device configured to send, via the unicast service wireless coverage area, the broadcast data to a single device via a point-to-point communication protocol. In this regard, the system can provide continuous, or near continuous, streaming of the broadcast data, video content, premium video content, etc. to the mobile device when the mobile device moves from an LTE broadcast (LTE-Broadcast) capable service area to a non-MBMS capable service area—without service interruption.

In an embodiment, the operations can further include re-initiating, continuing, etc. the broadcast transmission of the broadcast data from the broadcast enabled access point device to the mobile device in response to detecting a second movement of the mobile device from the unicast service wireless coverage area to the broadcast service wireless coverage area.

In one embodiment, the unicast enabled access point device is an LTE based access point device configured to send an MBMS broadcast transmission. In another embodiment, the unicast enabled access point device is a UTRAN enabled access point device.

In another embodiment, the initiating of the unicast transmission can comprise establishing, via the unicast enabled access point device, a bearer communication channel corresponding to a quality of service of a broadcast bearer communication channel corresponding to the broadcast transmission. In yet another embodiment, the bearer communication channel comprises a dedicated bearer communication channel.

In an embodiment, the initiating of the unicast transmission can comprise establishing, via the unicast enabled access point device, a default bearer communication channel to carry the broadcast transmission in response to determining that dedicated bearer resources are not available in the unicast service wireless coverage area.

In one embodiment, the detecting of the first movement can comprise receiving an indication from the mobile device representing a failure of reception of the broadcast transmission. In another embodiment, the detecting of the first movement can comprise detecting a handover request corresponding to the broadcast enabled access point device.

In yet another embodiment, the initiating of the unicast transmission can comprise storing, buffering, etc. a copy of the broadcast data in a memory, buffer, etc. and initiating the unicast transmission from the unicast enabled access point device to the mobile device utilizing the copy of the broadcast data, e.g., to facilitate the continuous, or near continuous, streaming of the broadcast data to the mobile device.

In an embodiment, the initiating can comprise initiating the unicast transmission from the unicast enabled access point device in response to determining that the unicast enabled access point device is configured to send the broadcast data using a carrier frequency compatible with the broadcast transmission.

In one embodiment, the initiating of the unicast transmission can comprise initiating the unicast transmission in response to determining that a resource allocation corresponding to the unicast enabled access point device satisfies a defined condition with respect to a transmission bandwidth of the unicast enabled access point device.

In another embodiment, the initiating of the unicast transmission can comprise granting, based on a premium being charged to an account corresponding to the mobile device, an on-demand access of the unicast transmission of the broadcast data in response to determining that a resource allocation corresponding to the unicast enabled access point device satisfies a defined condition with respect to an exhaustion of a resource of the unicast enabled access point device.

In an embodiment, a method can comprise: determining, by a system comprising a processor, that a user equipment (UE), mobile device, etc. is receiving a broadcast transmission of multimedia content, e.g., video content corresponding to an LTE eMBMS video broadcast service, from a broadcast access point device that is configured to send, via a broadcast wireless coverage area, the broadcast transmission to multiple devices via a point-to-multipoint wireless communication protocol; detecting, by the system, a relocation of the user equipment from the broadcast wireless coverage area to a unicast wireless coverage area; and in response to the detecting of the relocation, initiating, by the system, a unicast transmission of the multimedia content, video content, etc. from a unicast access point device to the user equipment—the unicast access point device configured to send, via the unicast wireless coverage area, the multimedia content, video content, etc. to a single device via a point-to-point wireless communication protocol.

In one embodiment, the initiating of the unicast transmission can comprise establishing a bearer communication channel to carry the broadcast transmission.

In another embodiment, the initiating of the unicast transmission can comprise storing, buffering, etc. a copy of the multimedia content, video content, etc. in a memory, buffer, etc. and initiating the unicast transmission utilizing the copy of the multimedia content, video content, etc.

One embodiment can comprise a computer-readable storage device having stored thereon executable instructions that, in response to execution, cause a device comprising a processor to perform operations, the operations comprising: determining that a mobile device is receiving, via a broadcast wireless coverage area, a broadcast transmission of a data stream via a broadcast bearer channel—the broadcast transmission corresponding to a point-to-multipoint wireless communication protocol.

Further, the operations can comprise initiating, via the unicast wireless coverage area, a unicast transmission of the data stream via a bearer communication channel corresponding to a quality of service of the broadcast bearer channel in response to detecting a first movement of the mobile device from the broadcast wireless coverage area to a unicast wireless coverage area—the unicast transmission corresponding to a point-to-point wireless communication protocol.

In an embodiment, the operations can further comprise re-initiating, continuing, etc. the broadcast transmission of the data stream via the broadcast bearer channel in response to detecting a second movement of the mobile device from the unicast wireless coverage area to the broadcast wireless coverage area.

In another embodiment, the initiating comprises storing a copy of a portion of the data stream in a memory, storage device, etc. and initiating the unicast transmission using the copy of the portion of the data stream.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "function", "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a network device, a gateway, a wireless communication device, etc., by receiving reports from such communication equipment, by receiving operator preferences, by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by LTE-Broadcast transfer system 110 (see below), comprising, but not limited to, determining that a mobile device is receiving a broadcast transmission of a broadcast data from a broadcast enabled access point device that is configured to send, via a broadcast service wireless coverage area, the broadcast data to multiple devices via a point-to-multipoint communication protocol; detecting a first movement of the mobile device from the broadcast service wireless coverage area to a unicast service wireless coverage area; and in response to the detecting of the first movement, initiating a unicast transmission of the broadcast data from a unicast enabled access point device to the mobile device—the unicast enabled access point device is configured to send, via the unicast service wireless coverage area, the broadcast data to a single device via a point-to-point communication protocol.

A classifier can be a function that maps an input attribute vector, x=(x1, x2, x3, x4, xn), to a confidence that the input belongs to a class, that is, f(x)= confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., LTE-Broadcast transfer system 110 (see below), to automatically receive, monitor, review, etc. network information, e.g., representing communication traffic conditions, etc. corresponding to a broadcast transmission, e.g., comprising premium video broadcast content, directed to a mobile device, e.g., and detect a movement of a mobile device, which is receiving the premium video broadcast content, between a broadcast service wireless coverage area and a unicast service wireless coverage area.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Aspects, features, and/or advantages of the disclosed subject matter can be exploited in substantially any wired telecommunication technology and/or any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (GPRS); third generation partnership project (3GPP) LTE; third generation partnership project 2 (3GPP2); ultra mobile broadband (UMB); 3GPP UMTS; high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can comprise second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, terms like "user equipment," "mobile station," "mobile device," "mobile subscriber station," "access terminal," "terminal", "handset," "appliance," "machine," "wireless communication device," "cellular phone," "personal digital assistant," "smartphone," "wireless device", and similar terminology refer to a wired and/or wireless device, or wired and/or wireless communication device, which is at least one of (1) utilized by a subscriber of a wired and/or wireless service, communication service, etc. to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

Likewise, the terms "local wireless communications cite," "access point" (AP), "base station," "Node B," "eNodeB" (eNB), and the like are utilized interchangeably in the subject specification and drawings and refer to a wireless network component or apparatus that sends and/or receives data associated with voice, video, sound, and/or substantially any data-stream or signaling-stream between a set of subscriber stations and/or to/from a wireless communication device—unless context warrants particular distinction(s) among the terms. Further, the data and signaling streams can be packetized or frame-based flows.

A communication network, e.g., LTE-Broadcast core network 220, corresponding to an LTE broadcast environment (see e.g., 200, 400, 600, 700, 800), for systems, methods, and/or apparatus disclosed herein can comprise any communication network, e.g., mobile and/or wire line-based circuit-switched communication network, etc. comprising, e.g., a global systems for mobile communication (GSM) network, a time division multiple access (TDMA) network, a code division multiple access (CDMA) network, such as IS-95 and subsequent iterations of CDMA technology, an integrated digital enhanced network (iDEN) network, a public switched telephone network (PSTN), etc. Further, examples of the communication network can comprise any suitable data packet-switched or combination data packet/circuit-switched communication network, wired or wireless IP network such as a VoLTE network, a VoIP network, an IP data network, a UMTS network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device, UE, etc. (see e.g., UE 214) for systems, methods, and/or apparatus disclosed herein can comprise a wireless device, a wired device, e.g., physically coupled to the communication network, a mobile device, a mobile phone, a 2G, 3G, 4G, . . . , etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX phone, a smartphone, a laptop device, a tablet device, a television device, a vehicle device, a home security system device, a portable computer, a wireless system, a sensor, or any suitable combination thereof. Specific examples of the communication device can comprise, but are not limited to, a cellular device, such as a GSM, TDMA, CDMA, IS-95 and/or iDEN phone, a cellular/Wi-Fi device, such as a dual-mode GSM, TDMA, IS-95 and/or iDEN/VoIP phones, UMTS phones, UMTS VoIP phones, a Wibree based device, or like devices or combinations thereof.

As mentioned, conventional mobile network technologies have had some drawbacks with respect to maintaining broadcast, e.g., LTE-Broadcast, services to a mobile device when the mobile device moves between a broadcast enabled service area and a non-broadcast enabled, or non-contiguous LTE-Broadcast, service area. For example, when an LTE-Broadcast enabled mobile device that is capable of receiving premium video broadcast content from an LTE/LTE-Advanced network moves within an LTE coverage area, geographical area, etc. that is served by multiple radio access network elements (eNBs or cell sites), and if there are non-contiguous cells, e.g., reserved cells, within such geographical area without MBMS capability, there is a potential for service interruption.

One conventional solution to minimizing service interruption is use of intelligent middleware implemented in the LTE-Broadcast enabled mobile device. However, such an approach could heavily tax the battery life of the mobile device due to intensive computer processing unit (CPU) handling required for the video data. For example, multiple broadcast video streams exacerbate battery life problems on the mobile device and can prevent it from handling regular data services—resulting in poor end user experience(s). Another issue with such middleware capability relates to the mobile device communicating with a content server to be able to switch from broadcast to unicast mode. In such scenario, content, premium content, etc. is transferred over a "best effort" LTE data radio bearer without meeting quality of service constraints.

On the other hand, various embodiments disclosed herein can maintain such services to the mobile device by initiating a unicast transmission of broadcast data to the mobile device within the non-broadcast enabled, non-contiguous LTE-Broadcast, etc. service area.

In this regard, and now referring to FIGS. 1-5, LTE-Broadcast transfer system 110 can comprise detection component 112 and transfer component 114. Detection component 112 can determine that a mobile device, e.g., UE 214, is receiving a broadcast transmission of broadcast data, e.g., corresponding to an LTE eMBMS video broadcast service, e.g., live video service, etc. from a broadcast enabled access point device, e.g., LTE-Broadcast (LTE-B) enabled eNB 240—the broadcast enabled access point device being configured to send, via a broadcast service wireless coverage area, geographical area, etc. the broadcast data to multiple devices via a point-to-multipoint, one-to-multiple, etc. communication protocol.

Further, detection component 112 can detect a movement of the mobile device from the broadcast service wireless coverage area to a unicast service wireless coverage area corresponding to a unicast enabled access point device, e.g., an LTE reserved cell without eMBMS capability (e.g., non-broadcast enabled LTE eNB 250), an LTE cell with eMBMS and unicast capability (e.g., LTE-B/unicast enabled eNB 310), etc. In this regard, transfer component 114 can be configured to initiate, based on the detected movement of the mobile device, a unicast transmission of the broadcast data from the unicast enabled access point device to the mobile device—the unicast enabled access point device being configured to send, via the unicast service wireless coverage area, the broadcast data to a single device, e.g., UE 214, via a point-to-point, one-to-one, etc. communication protocol.

To provide support for LTE-B transfer system 110, LTE-B core network 220 can comprise broadcast multicast service center (BMSC) 222, MBMS gateway (MGW) 228, and mobility management entity (MME) 232. BMSC 222 can provide an interface, e.g., billing interface, content interface, etc. for content providers with respect to live video streams, e.g., generic files, moving picture experts group (MPEG) dynamic adaptive streaming over hypertext transfer protocol (MPEG-DASH) video streams, etc. that are to be broadcast via LTE-B transfer system 110, e.g., as the broadcast data.

Coupled to BMSC 222, MGW 228 can deliver such streams, e.g., MBMS-based traffic, to multiple cell sites, e.g., in a single transaction, using Internet protocol (IP) multicast. MGW 228 is coupled to MME 232, which can perform MBMS session control signaling, e.g., MBMS session start, update, and stop. Further, MME 232 can deliver quality of service (QoS) information and MBMS service area information to a multi-cell/multicast coordination entity (MCE) (not shown), which can administer radio resources for the eMBMS session to all radios, eNBs, etc. that are part of the eMBMS service area.

It should be appreciated that although LTE-B transfer system 110 is illustrated separate from LTE-B core network 220, one or more components and corresponding functions of LTE-B transfer system 110 can be included in, and/or shared between, LTE-B core network 220.

Figure 4:
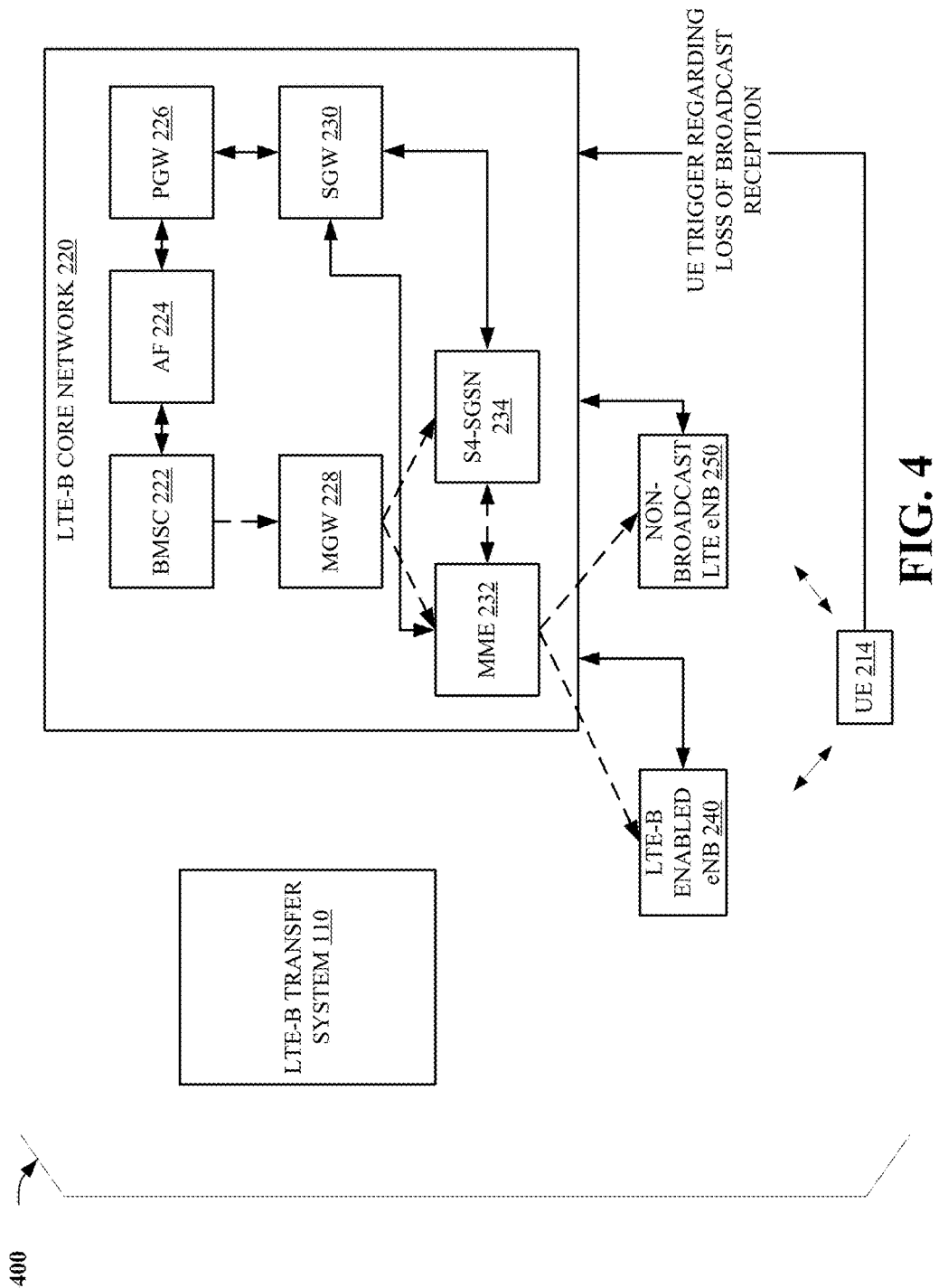
FIG. 4 illustrates a block diagram of another LTE broadcast environment, in accordance with various embodiments.
Figure 5:
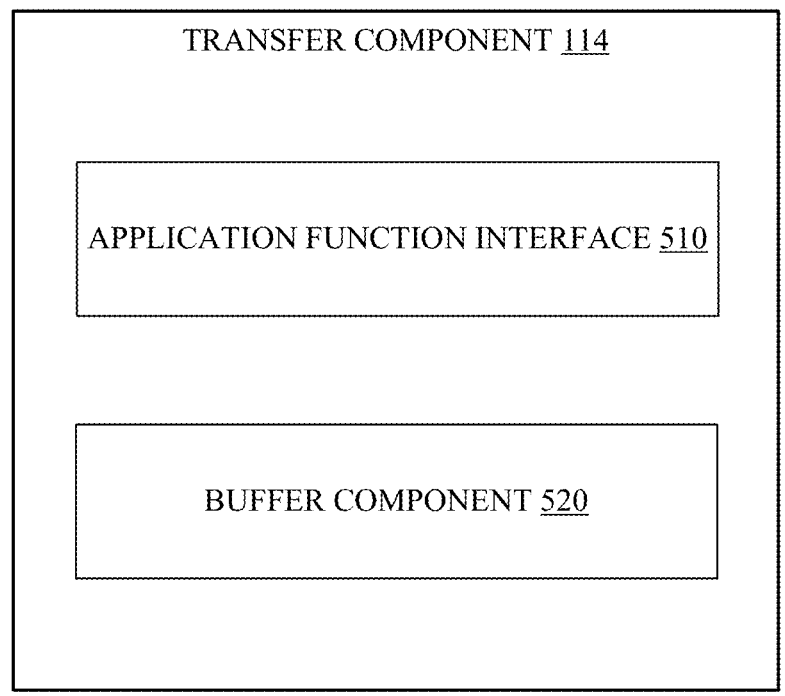
FIG. 5 illustrates a block diagram of a transfer component comprising a unicast resource component and an on-demand component, in accordance with various embodiments.

Now referring to embodiment(s) illustrated by FIGS. 4 and 5, detection component 112 can detect the movement of the UE in response to receiving information indicating the UE has detected a reduction, loss, etc. of LTE-B reception of a broadcast transmission from an LTE-B enabled, or serving, eNB. For example, if the UE determines that, e.g., based on measurement(s) of eNB signal(s), it is moving out of a wireless coverage area of the serving eNB, the UE can send a message, trigger, etc. directed to, towards, etc. BMSC 222 indicating the reduction, loss, etc. of LTE-B reception.

In one embodiment, the message, trigger, etc. can include information representing a capability of an access point, e.g., serving/source cell, target cell, etc., e.g., an LTE-B capability, radio access technology type, etc. of the access point. In turn, BMSC 222 can relay, via application function (AF) interface 510, such information to application function (AF) 224, which can initiate, trigger, etc. an equivalent bearer setup, e.g., a dedicated guaranteed bit rate (GBR) bearer, on the unicast enabled access point device, e.g., LTE reserved cell without eMBMS capability, non-broadcast enabled LTE eNB 250, etc.

In this regard, in an embodiment, transfer component 114 can establish, via the unicast enabled access point device, a bearer communication channel corresponding to a quality of service of a broadcast bearer communication channel corresponding to the broadcast transmission. Further, transfer component 114 can tear down the broadcast bearer communication channel, e.g., after establishment of the bearer communication channel.

In another embodiment, in response to a determination that dedicated bearer resources are not available in the unicast service wireless coverage area, transfer component 114 can establish, via the unicast enabled access point device, a default bearer communication channel to carry the broadcast transmission.

In an embodiment, AF 224 can trigger, initiate, etc. the equivalent bearer setup with public data network gateway (PGW) 226 to facilitate the unicast transmission of the broadcast data from a unicast enabled access point device to the mobile device. In this regard, PGW 226 can perform policy enforcement regarding access of network services and charging support, and is coupled to serving gateway (SGW) 230, which can route, forward, etc. user data packets/traffic to UE 214, e.g., via eNBs that are not LTE-B enabled.

In one embodiment, AF 224 can trigger, initiate, etc. the equivalent bearer setup with PGW 226 via an Rx interface (not shown) between AF 224 and a policy control and charging rules function (PCRF) (not shown), which can authorize communication(s), e.g., IP sessions meeting specific QoS requirement(s). In this regard, in an embodiment, AF 224 can trigger, initiate, etc. the equivalent bearer setup based on policy, charging, and/or geographical restrictions defined by PCRF.

In another embodiment, AF 224 can trigger, initiate, etc. the equivalent bearer setup with PGW 226 via a Gx interface (not shown) between the PCRF and PGW 226, e.g., corresponding to voice over LTE (VoLTE) applications. In another embodiment, AF 224 can trigger, initiate, etc. the equivalent bearer setup using a direct trigger between AF 224, and PGW 226, e.g., to minimize signaling associated with such bearer establishment.

In yet another embodiment, in response to receiving the trigger from AF 224, PGW 226 can initiate the dedicated GBR bearer setup on the unicast enabled access point device, e.g., LTE reserved cell without eMBMS capability, non-broadcast enabled LTE eNB 250, etc. for providing the unicast transmission of the broadcast data from the unicast enabled access point device to the mobile device.

In an embodiment, detection component 112 can detect the movement of the mobile device, UE, etc. based on a source eNB, e.g., LTE-B enabled eNB 240, triggering a handover to a target eNB, e.g., non-broadcast enabled LTE eNB 250, e.g., based on signal strength measurements, eNB neighbor list information indicating LTE-B capability, etc.

In another embodiment, detection component 112 can detect a movement of the mobile device from the unicast service wireless coverage area to the broadcast service wireless coverage area. In this regard, transfer component 114 can be configured to re-initiate, continue, etc. based on the detected movement, the broadcast transmission of the broadcast data from the broadcast enabled access point device, e.g., LTE-B enabled eNB 240.

Referring now to FIG. 5, transfer component 114 can comprise buffer component 520, which can receive the broadcast data and store, buffer, etc. a copy of the broadcast data in a memory, storage device, etc. (not shown). In this regard, transfer component 114 can initiate the unicast transmission from the unicast enabled access point device to the mobile device utilizing the copy of the broadcast data. In this regard, transfer component 114 can minimize switching latency during data transfer associated streaming data to the mobile device during movement between broadcast service and unicast service areas. In one embodiment, a size, or depth, of the buffer is configurable.

Figure 6:
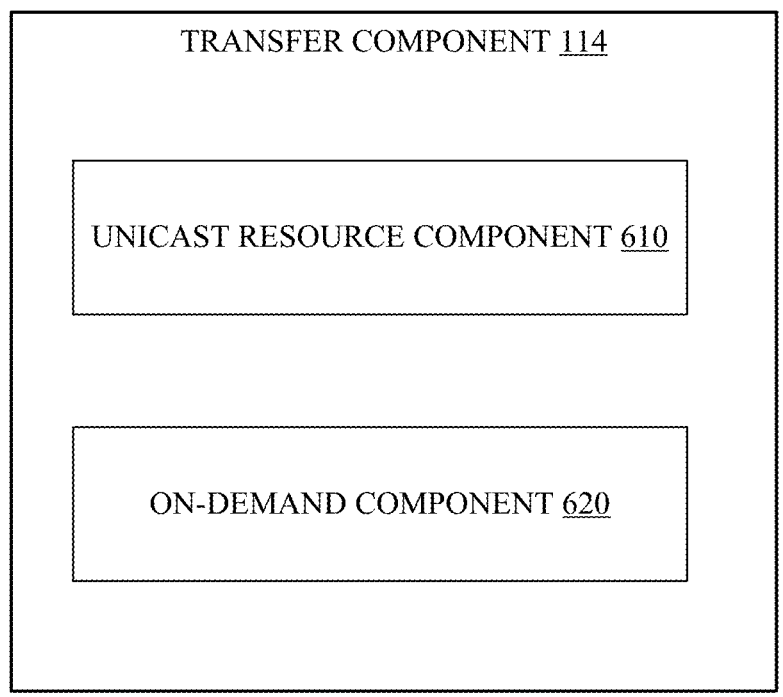
FIG. 6 illustrates a block diagram of an LTE broadcast environment comprising an LTE broadcast/unicast enabled wireless access point, in accordance with various embodiments.

FIG. 6 illustrates transfer component 114 comprising unicast resource component 610 and on-demand component 620. In an embodiment, unicast resource component 610 can be configured to determine whether the unicast enabled access point device is configured to send the broadcast data via the unicast service wireless coverage area using a carrier frequency that is compatible with the broadcast transmission, e.g., by LTE-B enabled eNB 240. In this regard, in response to determining that the unicast enabled access point device is configured to send the broadcast data using such carrier frequency, transfer component 114 can initiate the unicast transmission from the unicast enabled access point device.

In another embodiment, unicast resource component 610 can be configured to determine whether a resource allocation of the unicast enabled access point device satisfies a defined condition with respect to, e.g., available unicast transmission bandwidth corresponding to QoS constraints of the broadcast transmission, exhaustion of resource(s) of the unicast enabled access point device, etc. In this regard, transfer component 610 can initiate the unicast transmission in response to the resource allocation being determined to satisfy the defined condition with respect to the available unicast transmission bandwidth.

In yet another embodiment, in response to the resource allocation being determined to satisfy the defined condition with respect to the exhaustion of resource(s) of the unicast enabled access point device, on-demand component 620 can be configured to present, e.g., to a customer of the LTE eMBMS video broadcast service, an offer for an "on-demand" access of the unicast transmission, e.g., according to the QoS constraints of the broadcast transmission, based on a premium being charged to an account of the customer.

Figure 7:
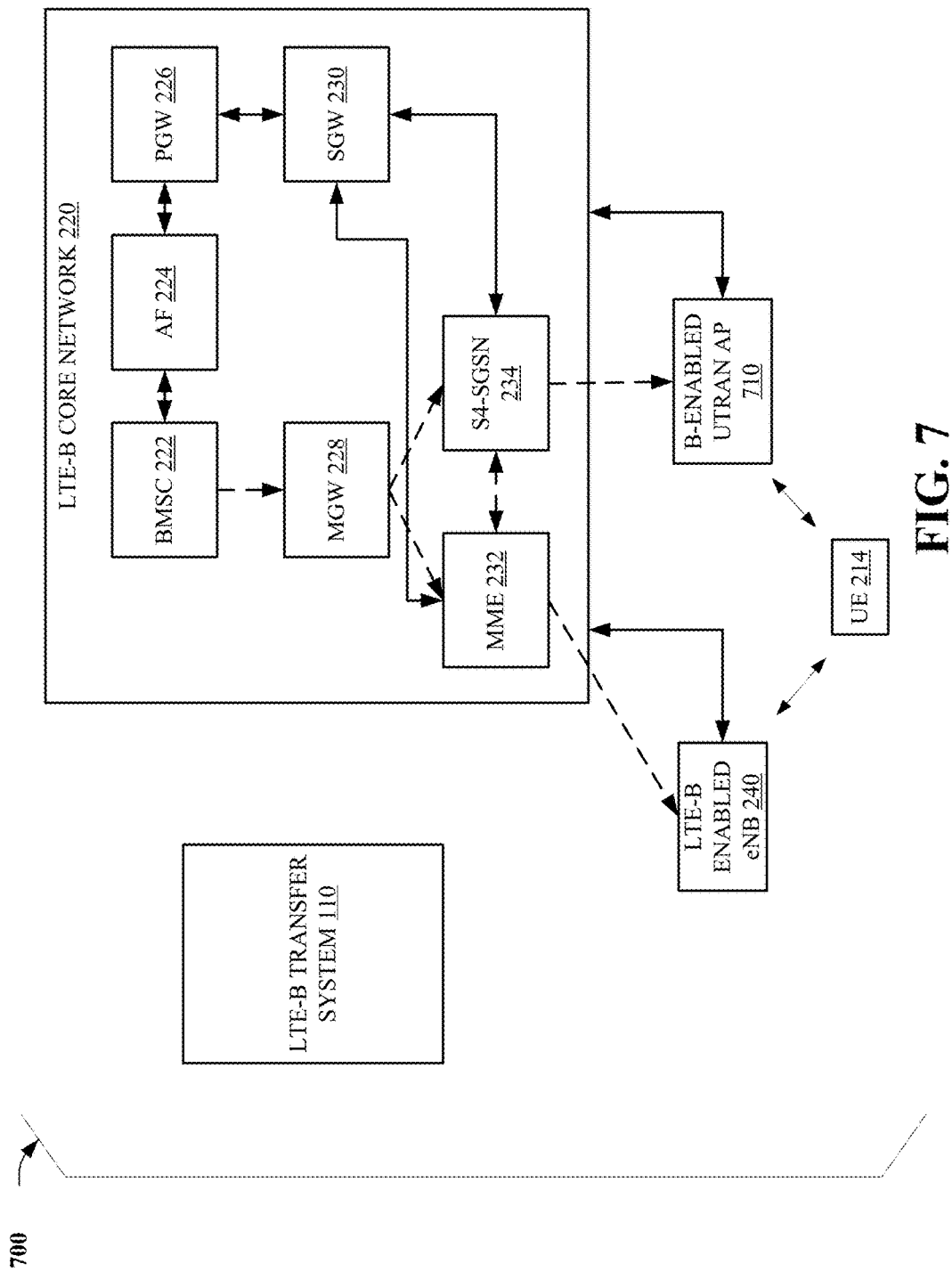
FIG. 7 illustrates a block diagram of an LTE broadcast environment comprising a broadcast enabled universal mobile telecommunication system (UMTS) terrestrial radio access network (UTRAN), in accordance with various embodiments.

FIG. 7 illustrates a block diagram of LTE broadcast environment 700 comprising broadcast enabled (B-enabled) UTRAN AP 710, in accordance with various embodiments. In this regard, detection component 112 can detect the movement of the mobile device from the broadcast service wireless coverage area to a non-LTE-based wireless coverage area corresponding to a non-LTE-based, e.g., 2G, 3G, etc. access point, e.g., B-enabled UTRAN AP 710. Further, transfer component 114 can be configured to initiate, based on the detected movement, the broadcast transmission of the broadcast data from the non-LTE-based access point to the mobile device.

In an embodiment, S4-serving general packet radio service support node (SGSN) 234, which performs packet routing and transfer, mobility management, authentication and charging functions, can provide MBMS-based traffic to a non-LTE-based, e.g., 2G, 3G, etc. access point as a "stop gap" approach to maintain an LTE-B service until the mobile device returns to the broadcast service wireless coverage area, e.g., S4-SGSN 234 and associated UTRAN being LTE-B capable and software licensed to deliver such service continuity during user mobility.

Figure 8:
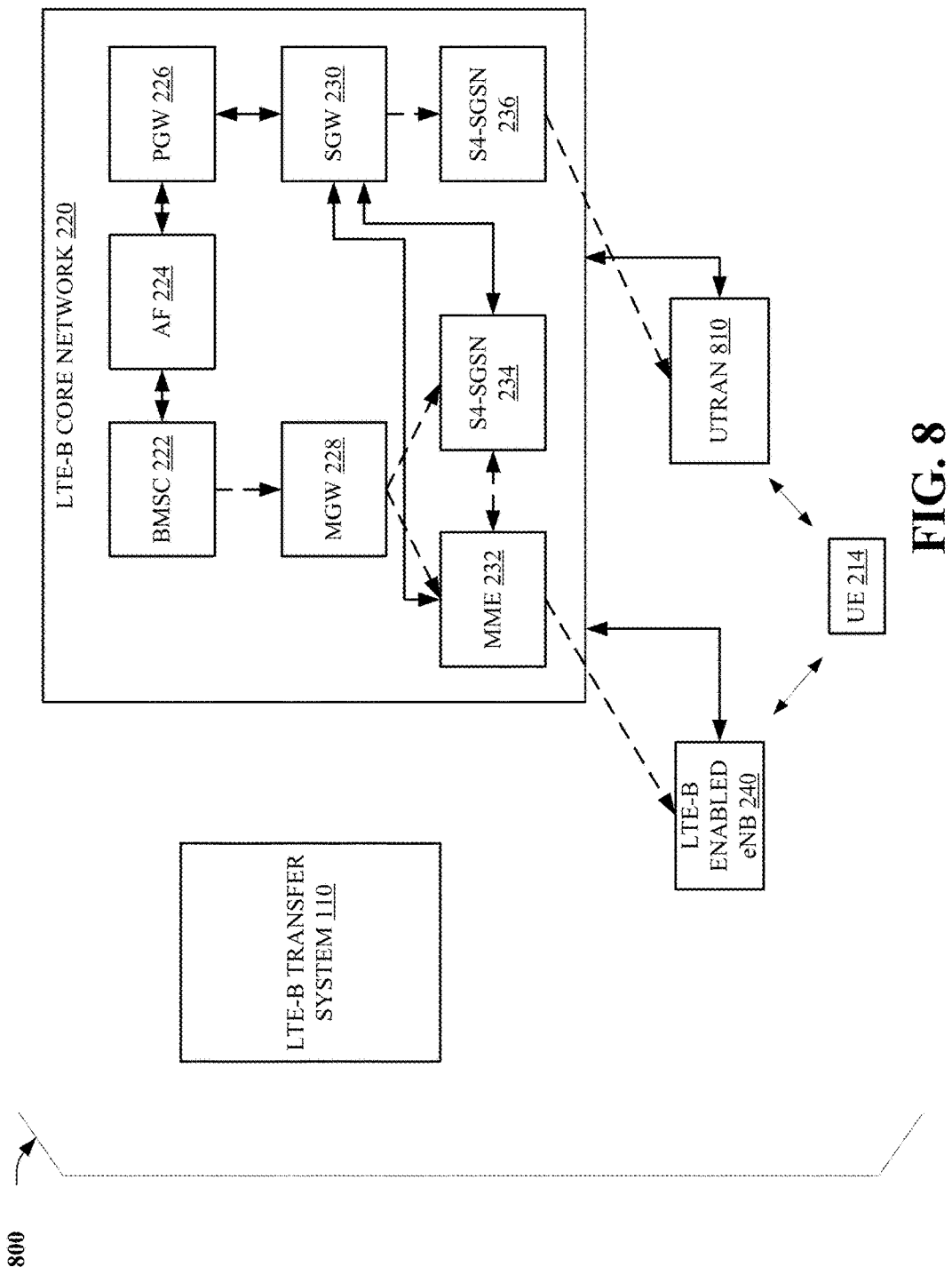
FIG. 8 illustrates a block diagram of an LTE broadcast environment comprising a non-broadcast enabled UTRAN, in accordance with various embodiments.

FIG. 8 illustrates a block diagram of LTE broadcast environment 800 comprising non-broadcast enabled UTRAN AP 810, in accordance with various embodiments. In this regard, detection component 112 can detect the movement of the mobile device from the broadcast service wireless coverage area to a non-LTE-based wireless coverage area corresponding to non-broadcast enabled UTRAN AP 810. Further, transfer component 114 can be configured to initiate, based on the detected movement, the unicast transmission of the broadcast data from non-broadcast enabled UTRAN AP 810 to the mobile device.

In one embodiment, SGW 230 can be coupled to S4-SGSN 236, which can perform transfer, mobility management, and authentication and charging functions, and route eMBMS-based traffic, e.g., the broadcast data, to non-broadcast enabled UTRAN AP 810.

FIGS. 9-14 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
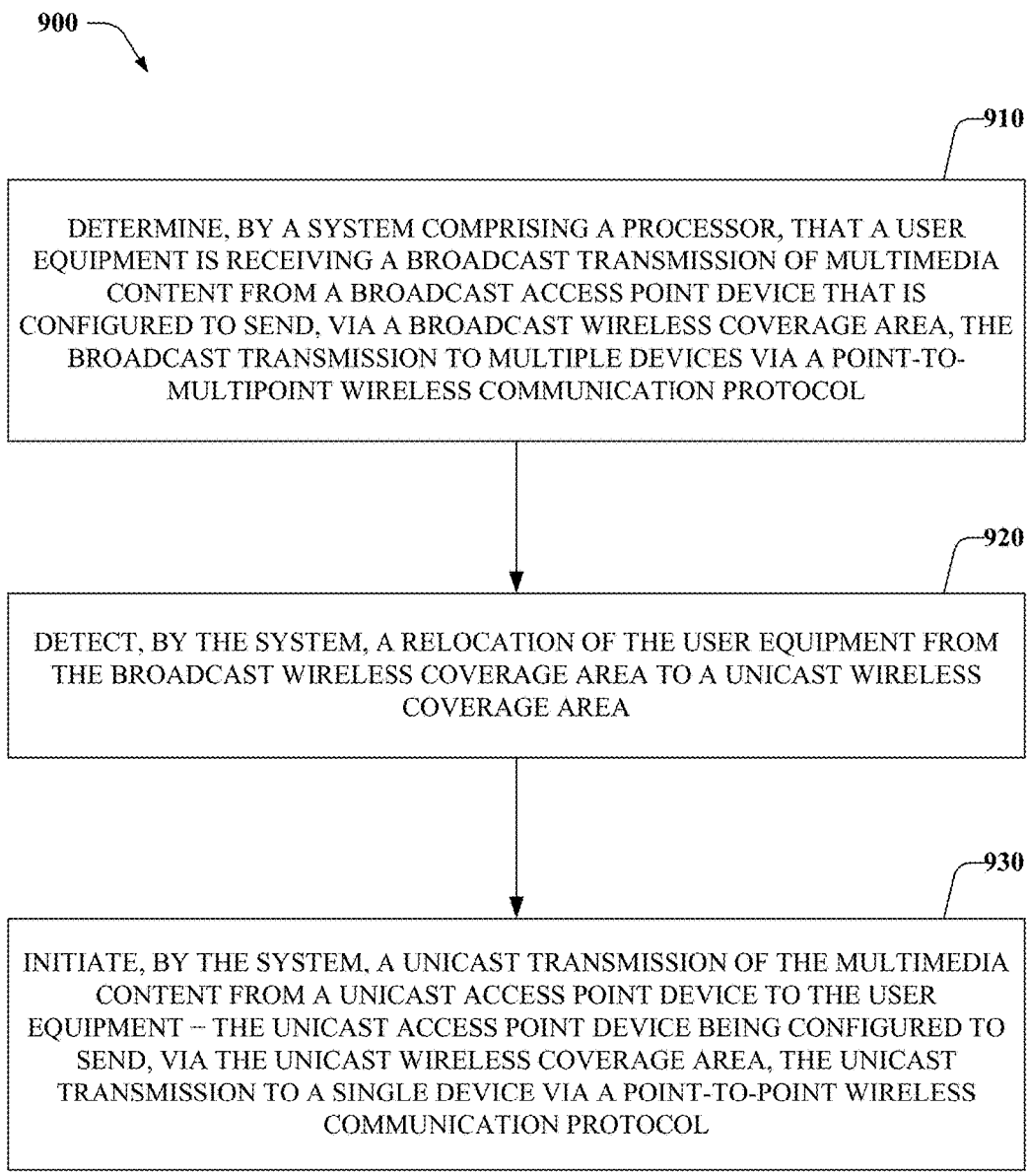
FIG. 9 illustrates a flowchart of a method performed by an LTE broadcast transfer system, in accordance with various embodiments.
Figure 10:
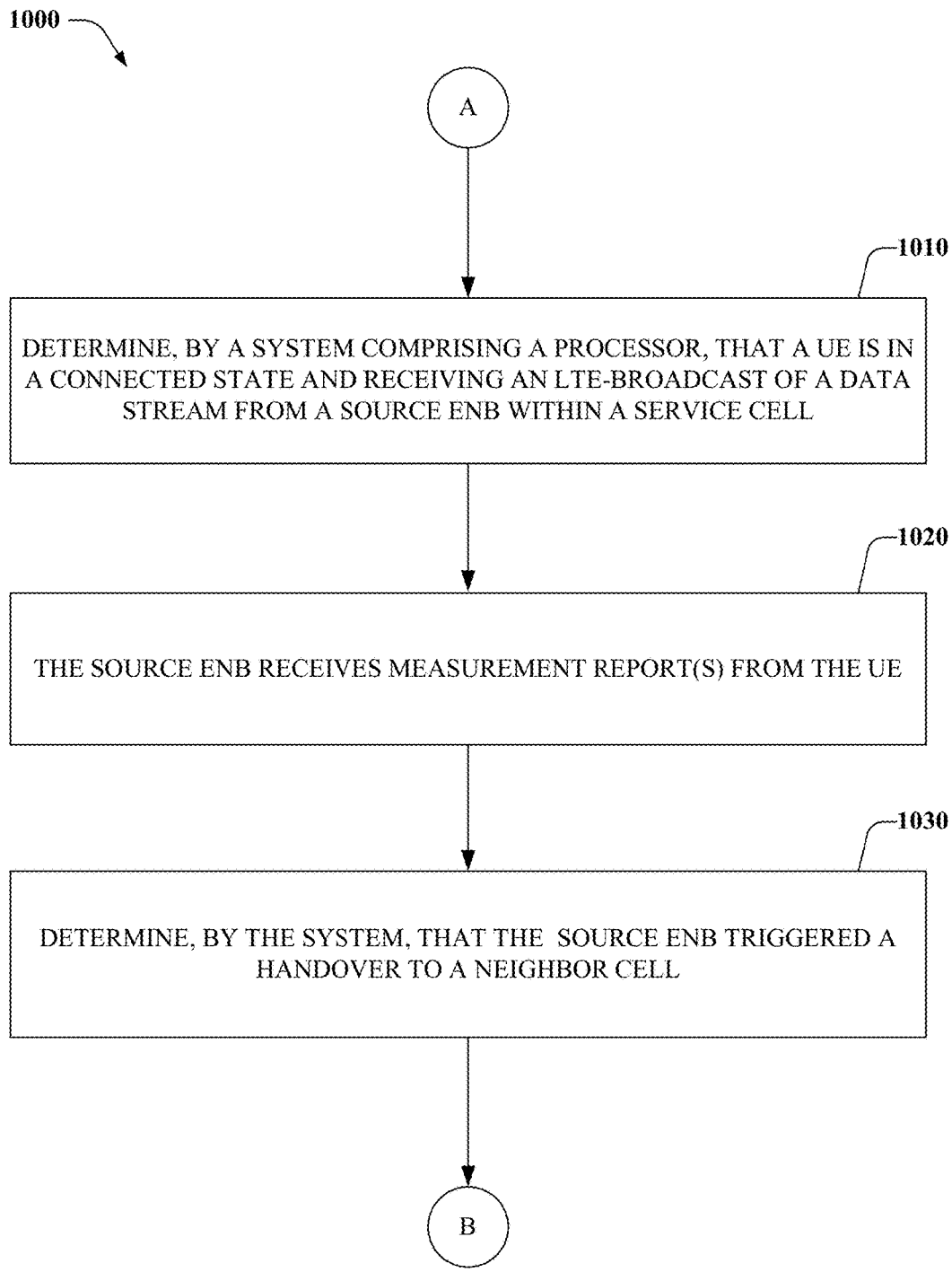
FIGS. 10-14 illustrate flowcharts of method(s) performed by an LTE broadcast transfer system, in accordance with various embodiments.
Figure 11:
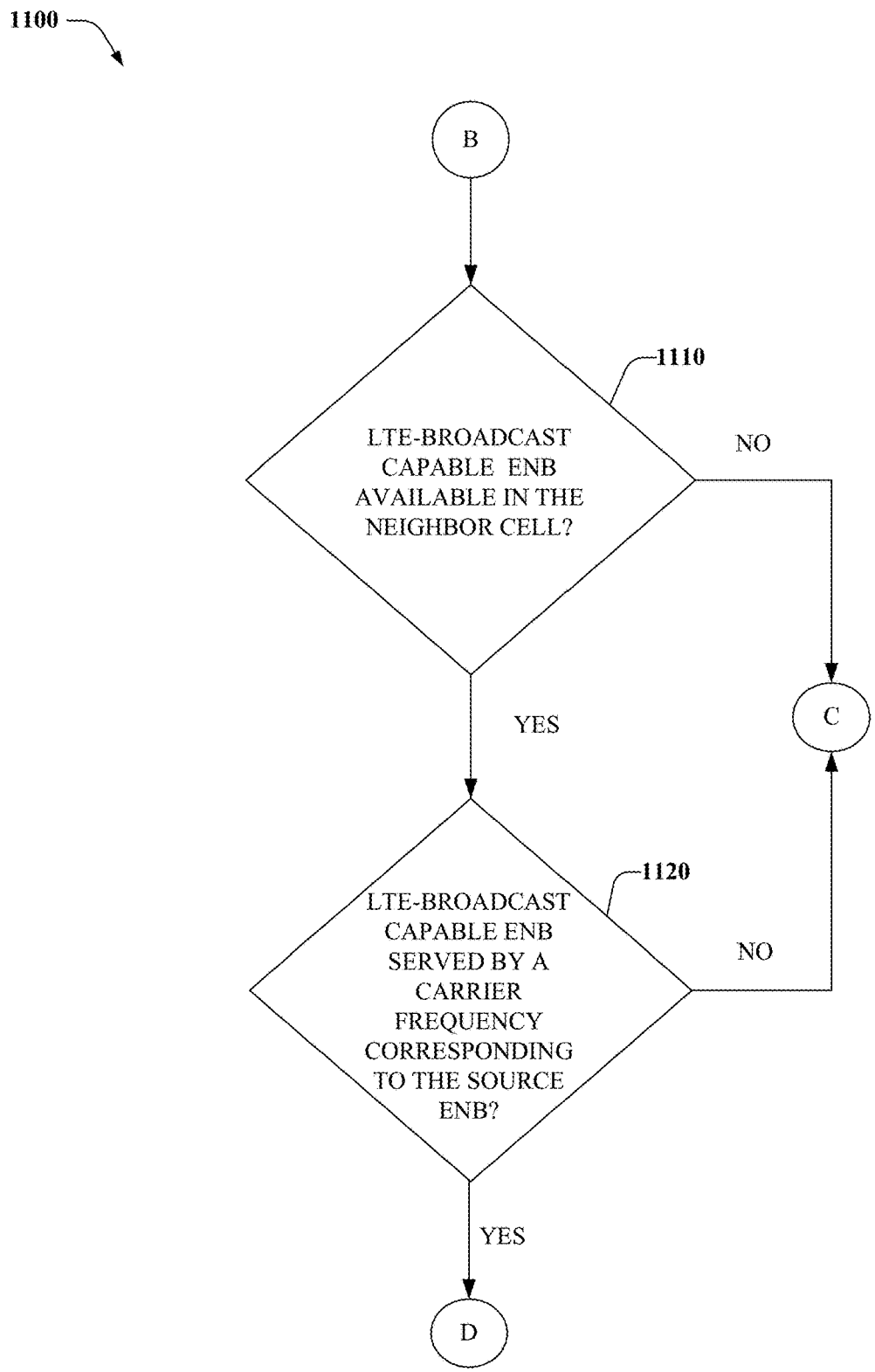
Figure 12:
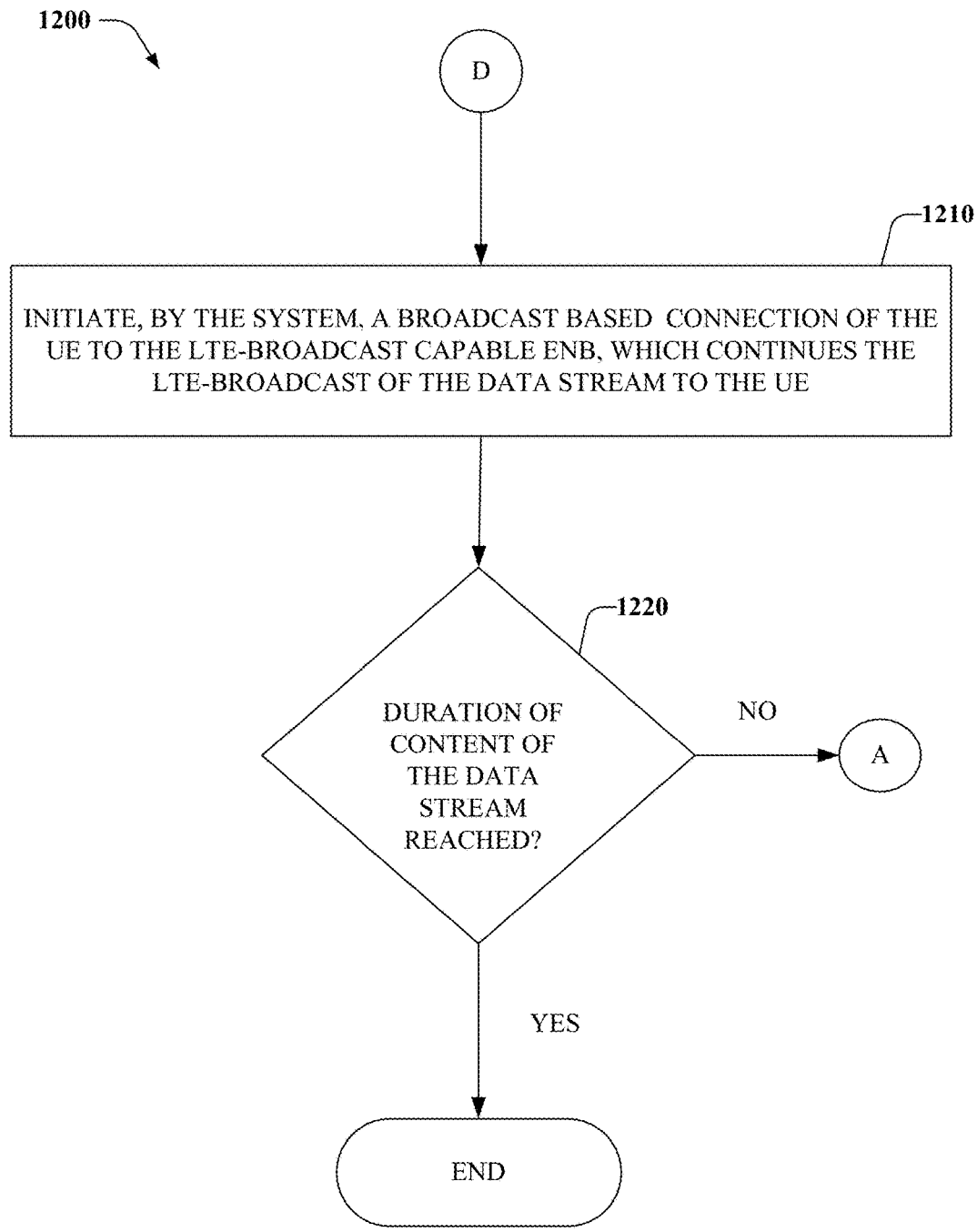
Figure 13:
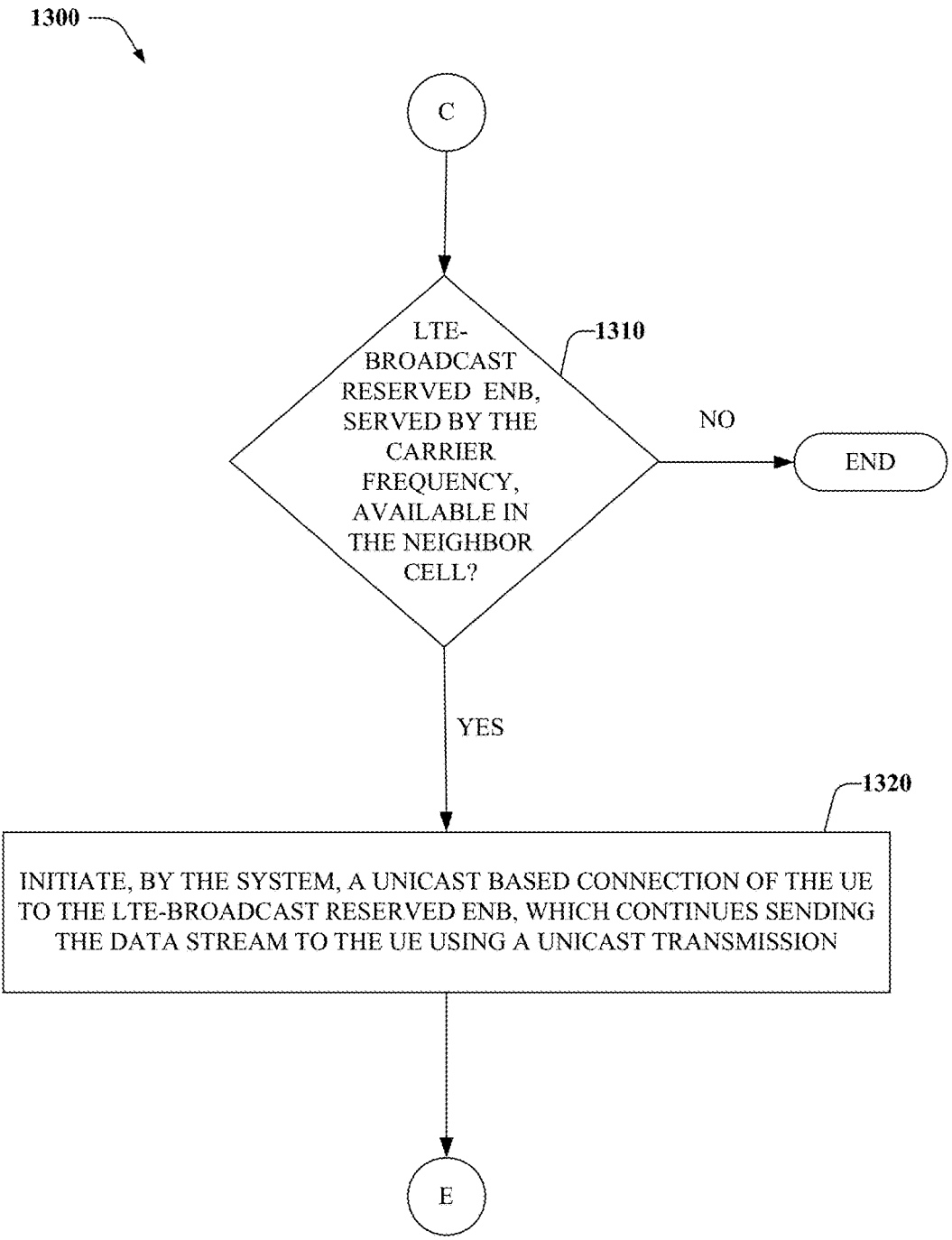
Figure 14:
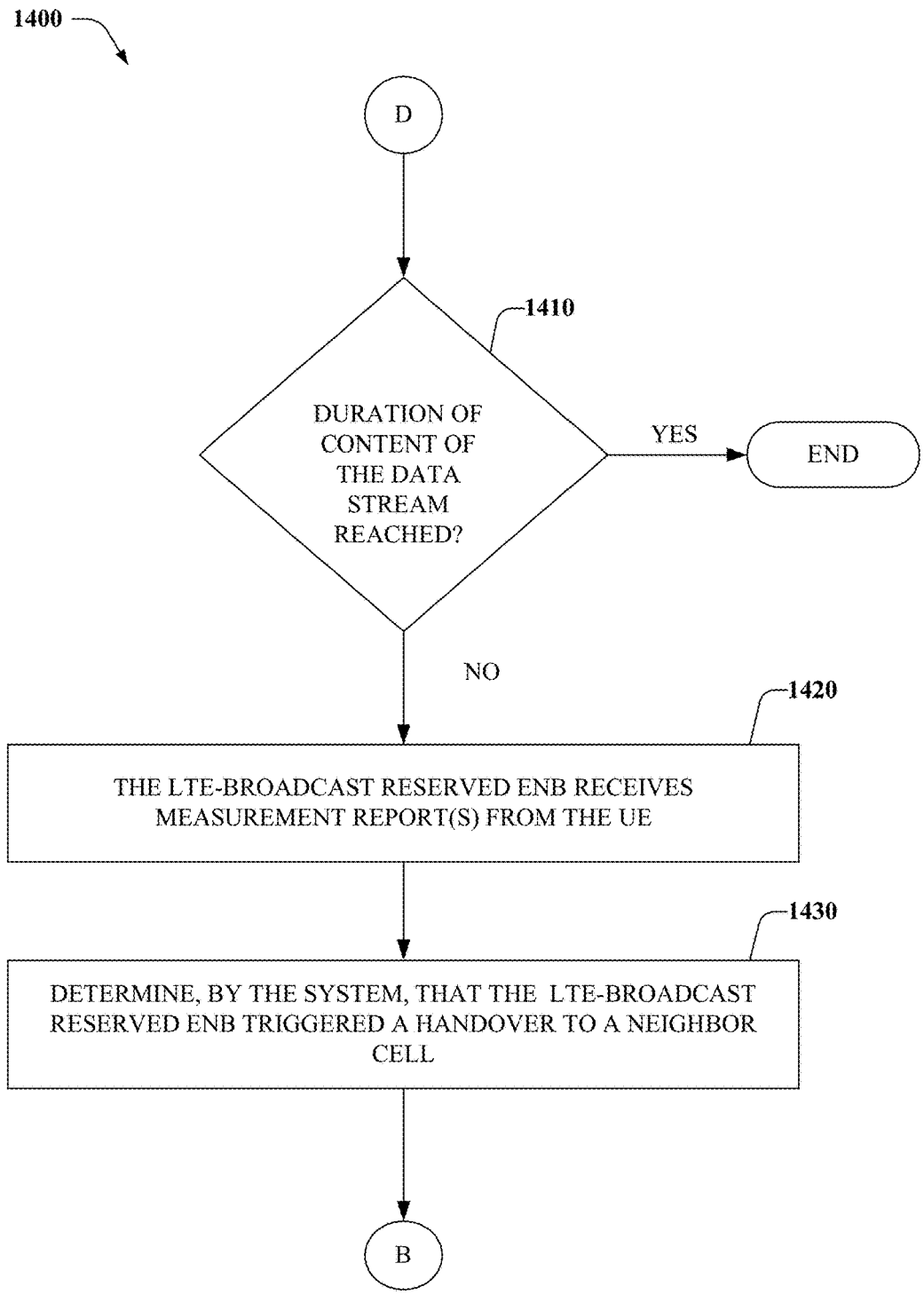

Referring now to FIG. 9, process 900 performed by a system comprising a processor, e.g., LTE-B transfer system 110, is illustrated, in accordance with various embodiments. At 910, it can be determined that a UE, mobile device, etc. is receiving a broadcast transmission of multimedia content, e.g., broadcast data associated with an LTE eMBMS video broadcast service, etc. from a broadcast AP that is configured to send, via a broadcast wireless coverage area, the broadcast transmission to multiple devices via a point-to-multipoint wireless communication protocol.

At 910, a relocation of the UE from the broadcast wireless coverage area to a unicast wireless coverage area can be detected. At 930, a unicast transmission of the multimedia content from a unicast AP to the UE can be initiated—the unicast AP being configured to send, via the unicast wireless coverage area, the unicast transmission to a single device via a point-to-point wireless communication protocol.

FIGS. 10-14 illustrate other processes (1000-1400) performed by the system, e.g., LTE-B transfer system 110, in accordance with various embodiments. At 1010, it can be determined that a UE is in a connected state and receiving, from a source eNB within a service cell, an LTE-broadcast of a data stream, e.g., corresponding to an LTE eMBMS video broadcast service. At 1020, the source eNB can receive measurement report(s) from the UE, and based on such reports, determine whether to trigger a handover to a neighbor cell. At 1030, it can be determined that the source eNB triggered the handover to the neighbor cell.

Flow continues from 1030 to 1110, at which it can be determined whether an LTE-B capable, enabled, etc. eNB is available, active, etc. in the neighbor cell. In this regard, if it is determined that the LTE-B capable eNB is available in the neighbor cell, flow continues to 1120, at which it can be determined whether the LTE-B capable eNB is served by a carrier frequency corresponding to the source eNB; otherwise flow continues to 1310. If it is determined, at 1120, that the LTE-B capable eNB is served by the carrier frequency, flow continues to 1210; otherwise flow continues to 1310.

At 1210, a broadcast based connection of the UE to the LTE-B capable eNB can be initiated, in which the LTE-B capable eNB can continue the LTE-B broadcast of the data stream to the UE. At 1220, if it is determined that a duration of content of the data stream is reached, e.g., end of video broadcast, then process 1200 ends; otherwise flow returns to 1010.

Returning to 1310, if it is determined that an LTE-B reserved eNB, e.g., white cell, etc., which is served by the carrier frequency corresponding to the source eNB, is available in the neighbor cell, flow continues to 1320, at which a unicast based connection of the UE to the LTE-B reserved eNB can be initiated, in which the LTE-B reserved eNB can continue sending the data stream to the UE using a unicast transmission; otherwise process 1300 ends.

Flow continues from 1320 to 1410, at which it can be determined whether a duration of content of the data stream is reached, e.g., end of video broadcast. In this regard, if it is determined at 1410 that the duration of content has been reached, process 1400 ends; otherwise flow continues to 1420, at which the LTE-B reserved eNB can receive measurement report(s) from the UE, and based on such reports, determine whether to trigger a handover to a neighbor cell. At 1430, it can be determined that the LTE-B reserved eNB triggered the handover to the neighbor cell, and flow continues to 1110.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in non-volatile memory 1522 (see below), disk storage 1524 (see below), and/or memory storage 1546 (see below). Further, nonvolatile memory can be included in read only memory (ROM), programmable ROM (PROM), electrically programmable ROM (EPROM), electrically erasable ROM (EEPROM), or flash memory. Volatile memory 1520 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 15:
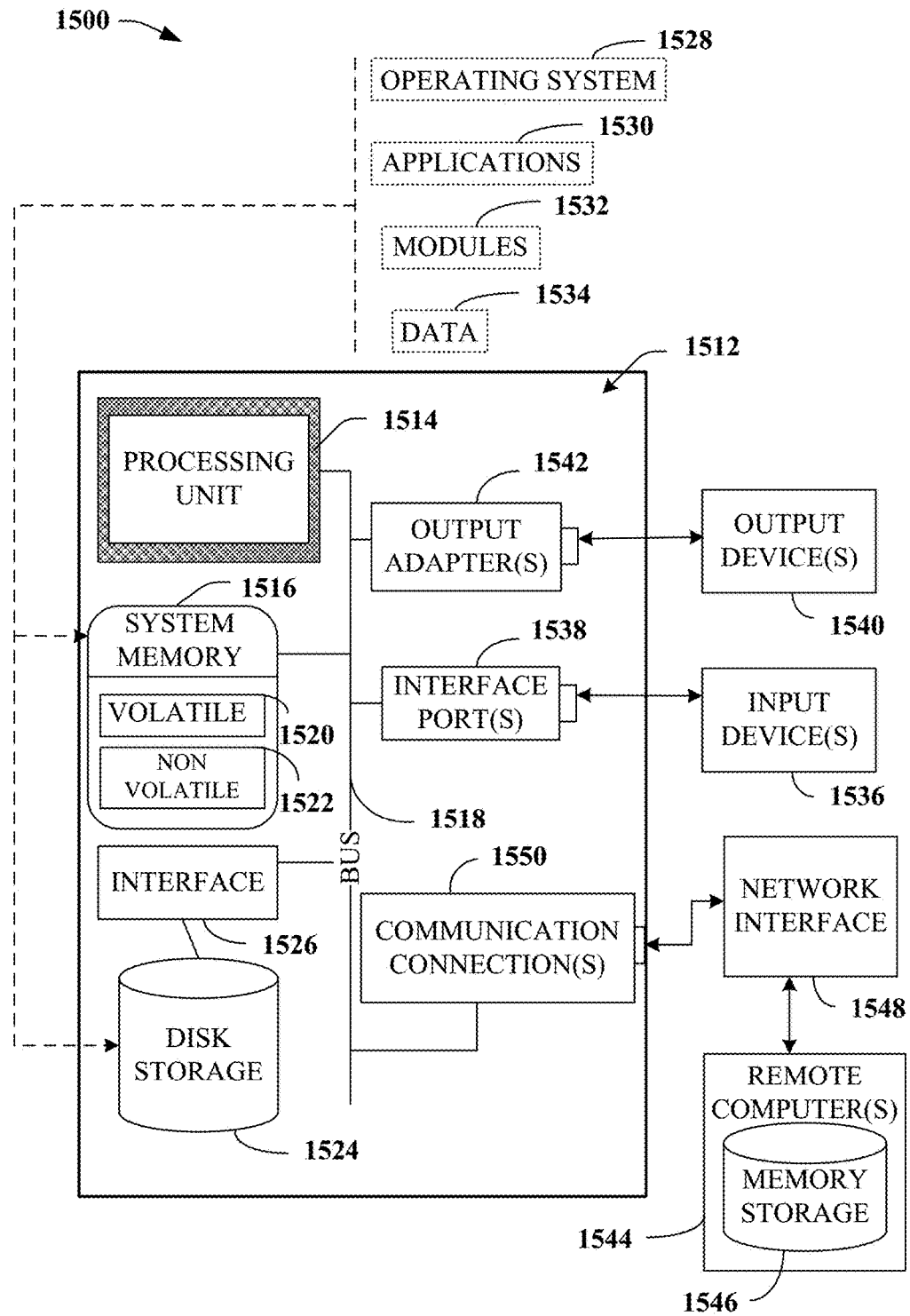
FIG. 15 is a block diagram representing an illustrative non-limiting computing system or operating environment in which one or more aspects of various embodiments described herein can be implemented.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 15, a block diagram of a computing system 1500 operable to execute the disclosed systems and methods is illustrated, in accordance with an embodiment. Computer 1512 comprises a processing unit 1514, a system memory 1516, and a system bus 1518. System bus 1518 couples system components comprising, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1516 comprises volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can comprise ROM, PROM, EPROM, EEPROM, or flash memory. Volatile memory 1520 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also comprises removable/non-removable, volatile/non-volatile computer storage media. FIG. 15 illustrates, for example, disk storage 1524. Disk storage 1524 comprises, but is not limited to, devices like a magnetic disk drive, floppy disk drive, tape drive, Jaz drive, Zip drive, LS-100 drive, flash memory card, or memory stick. In addition, disk storage 1524 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

It is to be appreciated that FIG. 15 describes software that acts as an intermediary between users and computer resources described in suitable operating environment 1500. Such software comprises an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be appreciated that the disclosed subject matter can be implemented with various operating systems or combinations of operating systems.

A user can enter commands or information into computer 1512 through input device(s) 1536. Input devices 1536 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1514 through system bus 1518 via interface port(s) 1538. Interface port(s) 1538 comprise, for example, a serial port, a parallel port, a game port, a universal serial bus (USB), a wireless based port, e.g., Wi-Fi, Bluetooth, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540, like display devices, light projection devices, monitors, speakers, and printers, among other output devices 1540, which use special adapters. Output adapters 1542 comprise, by way of illustration and not limitation, video and sound devices, cards, etc. that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, a workstation, a microprocessor based appliance, a peer device, or other common network node and the like, and typically comprises many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically and/or wirelessly connected via communication connection 1550. Network interface 1548 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can comprise, for example, internal and external technologies such as modems, comprising regular telephone grade modems, cable modems and DSL modems, wireless modems, ISDN adapters, and Ethernet cards.

The computer 1512 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1512 can connect to other devices/networks by way of antenna, port, network interface adaptor, wireless access point, modem, and/or the like.

The computer 1512 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations, comprising:
        determining that a mobile device is receiving a broadcast transmission of broadcast data from a broadcast enabled access point device that is configured to send, via a broadcast service wireless coverage area, the broadcast data to multiple devices via a point-to-multipoint communication protocol;
        receiving, upon a movement of the mobile device from the broadcast service wireless coverage area to a unicast service wireless coverage area, a message from the mobile device comprising reception information representing that the mobile device has detected a loss of reception of the broadcast data from the broadcast enabled access point device; and
        in response to the receiving the message comprising the reception information representing that the mobile device has detected the loss of reception of the broadcast data,
            obtaining, from the message, broadcast capability information representing a broadcast capability of a unicast enabled access point device corresponding to the unicast service wireless coverage area, and
            in response to a resource allocation of the unicast enabled access point device being determined to satisfy a defined condition representing a reduction of a unicast transmission bandwidth corresponding to quality of service constraints of the broadcast transmission, initiating, based on a premium being charged to an account corresponding to the mobile device, an on-demand unicast transmission, via the unicast enabled access point device according to the quality of service constraints of the broadcast transmission, of the broadcast data to the mobile device utilizing a copy of the broadcast data that has been stored in a buffer of a configurable size, wherein the unicast enabled access point device is configured to send, via the unicast service wireless coverage area, the broadcast data to a single device via a point-to-point communication protocol, and wherein the initiating comprises establishing, via the unicast enabled access point device, a bearer communication channel corresponding to a quality of service of a broadcast bearer communication channel corresponding to the broadcast transmission.

2. The system of claim 1, wherein the bearer communication channel comprises a dedicated bearer communication channel.

3. The system of claim 1, wherein the initiating comprises:
    in response to determining that dedicated bearer resources are not available in the unicast service wireless coverage area, establishing, via the unicast enabled access point device, a default bearer communication channel to carry the broadcast transmission.

4. The system of claim 1, wherein the reception information represents that the mobile device has determined, based on a measurement of a signal that has been received from the broadcast enabled access point device, the movement from the broadcast service wireless coverage area.

5. The system of claim 1, wherein the initiating comprises:

in response to detecting a handover request corresponding to the broadcast enabled access point device, initiating the on-demand unicast transmission.

6. The system of claim 1, wherein the initiating comprises:
storing the copy of the broadcast data in the buffer.

7. The system of claim 1, wherein the movement is a first movement, and wherein the operations further comprise:
in response to detecting a second movement of the mobile device from the unicast service wireless coverage area to the broadcast service wireless coverage area, re-initiating or continuing the broadcast transmission of the broadcast data from the broadcast enabled access point device to the mobile device.

8. The system of claim 1, wherein the initiating comprises:
in response to determining that the unicast enabled access point device is configured to send the broadcast data using a carrier frequency compatible with the broadcast transmission, initiating the on-demand unicast transmission from the unicast enabled access point device.

9. The system of claim 1, wherein the broadcast transmission comprises a long term evolution enhanced multimedia broadcast multicast service based transmission.

10. The system of claim 9, wherein the unicast enabled access point device comprises a long term evolution based access point device configured to send an enhanced multimedia broadcast multicast service broadcast transmission.

11. The system of claim 1, wherein the unicast enabled access point device is a universal terrestrial radio access network enabled access point device.

12. A method, comprising:
determining, by a system comprising a processor, that a user equipment is receiving a broadcast transmission of multimedia content from a broadcast access point device that is configured to send, via a broadcast wireless coverage area, the broadcast transmission to multiple devices via a point-to-multipoint wireless communication protocol;
receiving, by the system upon a movement of the user equipment from the broadcast wireless coverage area to a unicast wireless coverage area, a communication from the user equipment comprising first information indicating a loss of reception of the broadcast transmission from the broadcast access point device; and
in response to the receiving the communication comprising the first information indicating the loss of reception of the broadcast transmission,
obtaining, by the system, second information from the communication identifying a broadcast capability of a unicast access point device corresponding to the unicast wireless coverage area, and
in response to a resource allocation of the unicast access point device being determined to satisfy a defined condition representing a reduction of a unicast transmission bandwidth corresponding to a quality of service constraint of the broadcast transmission, initiating, by the system based on a premium being charged to an account corresponding to the user equipment, an on-demand unicast transmission, via the unicast access point device according to the quality of service constraint of the broadcast transmission, of a copy of the multimedia content that has been stored in a memory of a configurable buffer depth to the user equipment, wherein the unicast access point device is configured to send, via the unicast wireless coverage area, the on-demand unicast transmission to a single device via a point-to-point wireless communication protocol, and wherein the initiating comprises establishing, via the unicast access point device, a bearer communication channel based on a quality of service of a broadcast bearer communication channel of the broadcast transmission.

13. The method of claim 12, wherein the initiating comprises:
in response to detecting a handover request corresponding to the broadcast access point device, initiating the on-demand unicast transmission.

14. The method of claim 12, wherein the initiating comprises:
storing the copy of the multimedia content in the memory.

15. A non-transitory machine-readable storage medium, comprising executable instructions that, when executed by a system comprising a processor, facilitate performance of operations, comprising:
determining that a mobile device is receiving, from a broadcast access point device via a broadcast wireless coverage area, a broadcast transmission of a data stream via a broadcast bearer channel, wherein the broadcast access point device is configured to send, via the broadcast wireless coverage area, the broadcast transmission to multiple devices via a point-to-multipoint wireless communication protocol;
receiving, based on a movement of the mobile device from the broadcast wireless coverage area to a unicast wireless coverage area, a message from the mobile device comprising first information indicating that a reception of the broadcast transmission has been lost; and
in response to the receiving the message comprising the first information indicating that the reception of the broadcast transmission has been lost,
obtaining, from the message, second information indicating a broadcast capability of a target access point device of the unicast wireless coverage area, and
in response to determining that a resource allocation of the target access point device satisfies a defined condition representing a reduction of a unicast transmission bandwidth corresponding to quality of service constraints of the broadcast transmission, initiating, based on a fee being charged to an account associated with the mobile device, an on-demand unicast transmission, via the target access point device utilizing a bearer communication channel corresponding to a quality of service of the broadcast bearer channel with respect to the quality of service constraints of the broadcast transmission, of a copy of a portion of the broadcast transmission that has been stored in a memory of a configurable size to the mobile device, wherein the target access point device is configured to send, via the unicast wireless coverage area, the on-demand unicast transmission to a single device via a point-to-point wireless communication protocol.

16. The non-transitory machine-readable storage medium of claim 15, wherein the movement is a first movement, and wherein the operations further comprise:
in response to determining a second movement of the mobile device from the unicast wireless coverage area to the broadcast wireless coverage area, re-initiating or continuing the broadcast transmission of the data stream via the broadcast bearer channel.

17. The non-transitory machine-readable storage medium of claim 15, wherein the initiating comprises:
   in response to detecting a handover request, initiating the on-demand unicast transmission.

18. The non-transitory machine-readable storage medium of claim 15, wherein the initiating comprises:
   storing the copy of the portion of the broadcast transmission in the memory.

\* \* \* \* \*